US006817099B2

(12) United States Patent
Watts

(10) Patent No.: US 6,817,099 B2
(45) Date of Patent: Nov. 16, 2004

(54) THREADED PIPE CONNECTION AND METHOD

(75) Inventor: John Dawson Watts, Austin, TX (US)

(73) Assignee: Beverly Watts Ramas, Austin, TX (US)

( * ) Notice: Subject to any disclaimer, the term of this patent is extended or adjusted under 35 U.S.C. 154(b) by 251 days.

(21) Appl. No.: 09/747,000

(22) Filed: Dec. 21, 2000

(65) Prior Publication Data

US 2001/0001219 A1 May 17, 2001

Related U.S. Application Data

(63) Continuation-in-part of application No. 09/421,483, filed on Oct. 20, 1999, now abandoned.

(51) Int. Cl.⁷ ................................................ B23P 17/00
(52) U.S. Cl. ................ 29/890.14; 29/890.14; 29/558; 29/33 D; 29/4; 72/340
(58) Field of Search ...................... 29/890.14, 890.144, 29/897, DIG. 26, 523, 522.1, 557, 558, 33 D, 33 T; 285/333, 334, 370, 355; 72/340, 367.1, 370.03, 370.06, 370.1, 370.13, 370.17, 370.18; 411/DIG. 1; 403/343, 353

(56) References Cited

U.S. PATENT DOCUMENTS

| | | | | |
|---|---|---|---|---|
| 4,373,754 A | * | 2/1983 | Bollfrass et al. | 285/334 |
| 4,838,068 A | * | 6/1989 | Carlin et al. | 29/890.14 |
| 5,487,294 A | * | 1/1996 | Petersen | 72/306 |
| 5,517,843 A | * | 5/1996 | Winship | 72/306 |
| 6,024,646 A | * | 2/2000 | Reed et al. | 285/333 |

* cited by examiner

Primary Examiner—Charles T. Jordan
Assistant Examiner—T. Nguyen

(57) ABSTRACT

An integral high strength threaded pipe connection formed on joints of plain-end pipe, and a method for manufacturing, wherein the ends of the joints are rough machined, swaged, and then finish machined, preferably but not necessarily, with only one chucking.

14 Claims, 2 Drawing Sheets

THREADED PIPE CONNECTION AND METHOD

This application is a Continuation-In-Part of application Ser. No. 09/421,483 filed Oct. 20, 1999, to be abandoned after the present application is filed.

TECHNICAL FIELD

The use of screw threads to connect joints of pipe together so as to convey fluid, is a very old art that has progressed for hundreds of years in an effort to satisfy periodic needs for stronger and better sealing pipe connections. Performance requirements for pipe connections still vary widely today, such as for home piping with less than 80 psi fluid pressure and virtually no mechanical loads, to Oil Well Pipe that may be required to hold over 15,000 psi gas pressure and simultaneously, withstand extreme mechanical loadings and wide temperature fluctuations.

Due to the historical weakness of threaded pipe connections and their tendency to loosen, leak, and or break, their use in industrial plants and refineries has been limited by Industrial Codes to very small pipe sizes and low pressures. However, because there is no reasonable alternative pipe connection for use within the very limited hole sizes drilled for Oil & Gas Wells, threaded pipe connections are still used today, so most research and development of pipe connections has been directed toward such use.

In 1939 API adopted the 8Rd thread connection to connect joints of API tubing and casing which is still used to connect about 80% of well pipe today. My U.S. Pat. No. 5,427,418 filed in 1992 explained why API 8Rd Connections loosen and leak, and "API Item 2239 Work Group" discovered that fact in 1995 and recently adopted some principles of '418 in API "SR17 Supplemental Requirements for API LTC Connections with Specified Performance".

In an effort to provide pipe connections that sealed better than API 8Rd Connections, special "Premium" pipe connections were developed by numerous other parties who adopted thin annular sealing lips at the end of their pin threads as depicted in my U.S. Pat. No. 2,766,999 which was itself, a variation of my U.S. Pat. No. 2,766,829 which introduced proven reliable pressure-aided, high-pressure, high temperature metal seals to the nuclear and space industries as well as the oil and gas industry, which they now describe as "metal-to-metal seals". However, such seals when used in oil-well pipe connections suffer a loss of connection efficiency because the pipe wall thickness for supporting axial loads is reduced to form the lip and it's mating sealing surface, when formed in non-upset pipe ends.

There has been considerable confusion in the industry as to what constitutes a reliable qualification test for threaded pipe connections, which has resulted in too many sales claims reflecting hopes more than facts. New standard ISO-13679 gives promise to end that problem in that it allows one to choose the % efficiency ratings relative to the pipe ratings that a connection is to be tested and qualified for, under combinations of: internal pressure; external pressure; tension; compression; bending; temperature; and the choice of water or gas as the pressurizing fluid. It also specifies test procedures intended to accurately measure performance capability. Therefore, it is expected that the number of new connections offered for sale will decline in face of such stringent standards, but that real progress should accelerate because users can for the first time, begin immediate use of a new ISO qualified connection with confidence. Application for the instant invention is made with that realization in mind.

For purposes of the present invention, the following definitions will apply.

Flank angle=The acute angle in a plane coinciding with the pipe axis, measured between a thread flank and a plane positioned 90 degrees to the axis, the angle being plus if the flank faces away from the axis, the angle being minus if the flank faces toward the axis.

Thread Turn=A 360 degree portion of a screw thread.

Metal-to-metal seal=Continuos intimate contact of an annular non-threaded sealing surface around a portion of a pin, with a mating box surface, sufficient to effect a seal against fluid pressure within or outside of the connection.

Pin=A tapered male pipe end having a first thread turn of smallest diameter and a last thread turn of largest diameter, which may or may not include a metal-to-metal sealing surface adjacent one or both ends of the thread.

Box=A tapered female pipe end formed to mate with the pin, having a first thread turn of largest diameter and a last thread turn of smallest diameter, which may or may not include a metal-to-metal sealing surface adjacent one or both ends of the thread.

Pin Critical Area=The annular cross-sectional area of the pin, in a plane positioned normal to the axis, at the largest diameter of the engaged threads.

Box Critical Area=The annular cross-sectional area of the box, in a plane positioned normal to the axis, at the smallest diameter of the engaged threads.

Stab Flank=flank of the thread form facing toward that end of the pipe joint.

Load flank=flank of the thread form facing away from that end of the pipe joint.

Stab pitch=axial length between stab flanks, one thread turn apart.

Load pitch=axial length between load flanks, one thread turn apart.

Full-strength connection=a pipe connection that will seal and not rupture under any combination of mechanical loads and fluid pressure under which, the VME yield stress of the pipe is not exceeded.

Upset end=A pipe end that been plastically deformed axially so as to increase the wall thickness to a greater dimension than the original pipe wall thickness.

Swaged end=A pipe end that has been plastically reformed radially so as to: increase the outer diameter of the end to exceed the original pipe diameter; or to decrease the inner diameter of the end to be less than the original pipe inner diameter.

End-length=means a predetermined length of the pipe as measured from a pipe end.

The meaning of all words not specifically defined herein, may be found in Webster's Dictionary.

BACKGROUND ART

It is well known in the art of threaded pipe connections, to upset the ends of a pipe joint for more than the length of threads to be later formed thereon, so as to increase the critical area of the pin and/or box. Allison U.S. Pat. No. 214,804 and Cummins U.S. Pat. No. 859,803 are early examples. Upsetting the ends of high strength steel pipe as used in Oil and Gas Wells requires very special machines that: heat the pipe end to above the lower critical temperature of the pipe material; grip the pipe adjacent it's end very firmly; then impact the pipe end so as to forge the end to fill special form dies as required for each pipe size and wall thickness. High strength pipe joints must then be re-heat treated and restraightened, which further increases their cost and decreases their availability.

It is also well known to swage pipe ends having full thickness walls for more than the length of threads to be formed thereon, so as to allow box threads to be formed on a larger diameter than the original pipe diameter, to increase the resulting critical areas. However, when a box is swaged for such length, the wall thickness at the critical section is reduced to less than the pipe wall thickness, which reduces the box critical area and reduces the pressure rating of the box to below the pipe rating because it then has both a thinner wall and a larger diameter.

Watts U.S. Pat. No. 5,516,158 discloses the self-swaging of pipe ends for only a portion of the thread lengths upon assembly of the connection, which is a very useful improvement especially on large diameter pipe. However, if the diameter change upon such swaging becomes too large a percentage of the pipe diameter such that the thread form is substantially changed, then some of the advantage may be lost, such as may be the case for small diameter pipe.

It is well known that the wall thickness, the engaged thread length, the flank angles and the critical areas of a threaded pipe connection affect the mechanical and fluid pressure strengths of a threaded pipe connection. Also well known is that, the critical area of the box increases with a decrease in the smallest diameter of thread engagement, and that the critical area of the pin increases with an increase in the largest diameter of thread engagement.

SUMMARY OF THE INVENTION

The present invention discloses a box and pin that may be formed on plain-end pipe and a method to manufacture them, so as to increase their critical areas to as much as the pipe cross-sectional area selectively, and thereby provide a higher strength integral pipe connection than hitherto possible, without first upsetting or swaging the full-thickness pipe end wall before threading it. The method generally comprises: machining a predetermined end-length of the pipe to a desired first configuration having a reduced wall thickness; swaging the first configuration to a second desired configuration while swaging the other side of the wall to a desired third configuration; and then machining the pipe end-length to the desired final dimensions. The axial length of the reduced thickness end-length swaged may be equal, more, or less than the engaged thread length, as opposed to prior art that upsets or pre-swages the full thickness pipe wall over the full thread length or longer. An advantage of the present invention over my self-swaging connection cited above, particularly for small diameter pipe connections, is that a precise thread form is maintained after assembly of the present invention, because the thread form is machined after swaging. The preferred embodiment is described as follows.

To manufacture the box end: counterbore a predetermined end-length of a pipe joint to form a reduced thickness pipe wall having a desired first configuration within the pipe end; swage outwardly, the first configuration to form a desired second configuration and the outer pipe surface opposite the first configuration to form a desired third configuration larger in outer diameter than the original pipe outer diameter; and then finish machine the end-length to the desired box dimensions.

To manufacture the pin end: remove a desired end-length of a pipe joint outer wall so as to form a reduced thickness pipe wall of predetermined length having a desired outer first configuration; swage inwardly, the first configuration to effect a second desired outer configuration and a desired third configuration of the pipe bore opposite the second configuration; and then finish machine the end-length to the desired pin dimensions.

It should be understood that so swaging such thinner end-lengths takes only a small fraction of the time and force that conventional upsetting or swaging of full thickness pipe walls for the length of the engaged thread so therefore, the entire procedure may be done on the same machine tool that threads the pin and/or box ends, which greatly reduces cost and delivery time. Thus, pipe inventories may be reduced, which promotes substantial savings and availability. Depending on the pipe size and material characteristics, such swaging may be done cold or selectively, after heating to above the lower critical temperature as with an induction coil, when required by pipe dimensions, pipe material or customer specifications.

The configurations described above may comprise any combination of cylindrical, conical or curved portions. The scope of the present invention includes boxes and pins made with or without metal-to-metal seals, at either or both ends of the engaged threads. When metal-to-metal seals are required, the end-lengths are dimensioned longer sufficiently to provide for such seals, and the threads may or may not be dimensioned to seal, depending on the intended service requirements.

Any suitable thread form may be used with the present invention, however for maximum utility, the open wedge thread form of my co-pending application Ser. No. 09/573, 480 or co-pending application PCT/US00/28829 is preferred, in that it provides a wide torque range even when machined on thin wall pipe, and will withstand very high mechanical and fluid pressure loads.

Thus, it is now clear that the present invention teaches how to manufacture a cost-effective high strength integral threaded pipe connection on plain-end pipe, that may be rated selectively, as high as a full strength connection.

DETAILED DESCRIPTION

Figure 1:
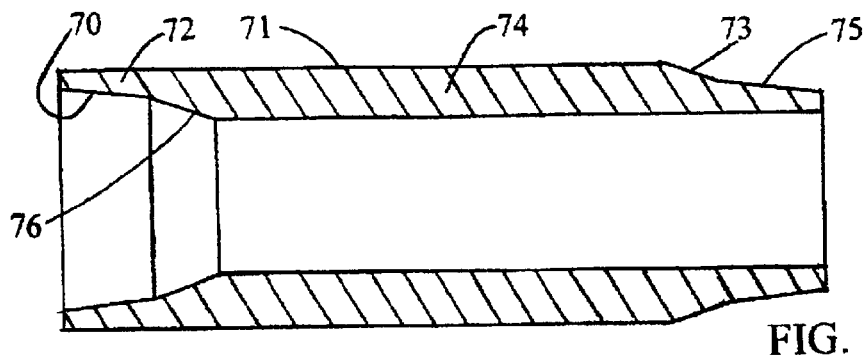
FIG. 1 depicts sections of a pin and box of a preferred embodiment after preliminary machining but before swaging.
Figure 2:
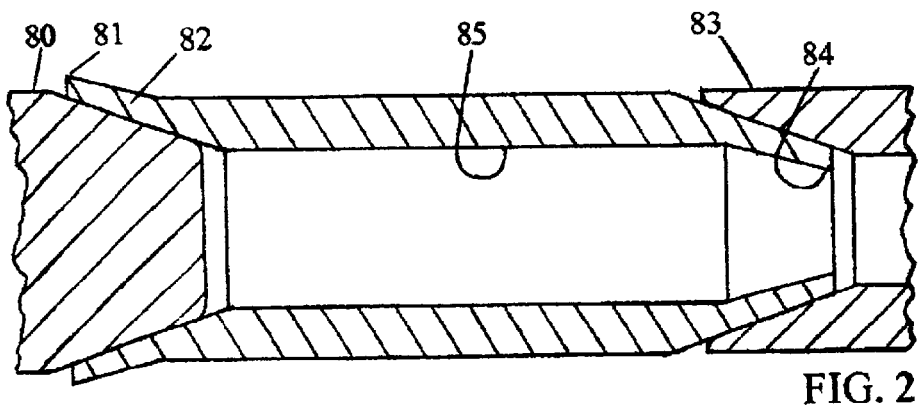
FIG. 2 depicts the pin and box of FIG. 1 after swaging.

FIG. 1 depicts a box end-length counterbored to form a desired first internal configuration comprising: conical surface 70 having less taper if any, than the thread taper; and conical surface 76 which approximates the thread taper, positioned intermediate surface 70 and 40 pipe bore 85, so as to form a shaped length thinner than original pipe wall 74. Then, swage mandrel 80 as shown in FIG. 2 is forced axially into the counterbore so as to swage outwardly the first configuration into a desired second configuration comprising surface 76 and surface 70 which has been swaged outwardly to effect an extension of surface 76, while simultaneously swaging the outer pipe diameter opposite the second configuration outwardly to a third desired configuration having diameters greater than the original pipe outer diameter as at 81.

FIG. 1 also depicts a pin end machined to form a desired first external configuration comprising: conical surface 75 having a slower taper than does the thread taper, positioned adjacent the pipe end; and conical surface 73 which approximates the thread taper, positioned intermediate surface 75 and the pipe O.D. so as to form a shaped length thinner than pipe wall 74. Then, annular swage tool 83 shown in FIG. 2 is forced axially therearound so as to swage the first configuration into a desired second configuration comprising surface 73 and surface 75 which has been swaged inwardly to effect an extension of surface 73, while simultaneously swaging the pipe bore opposite the second configuration inwardly, to a third desired configuration having diameters less than the original pipe bore as at 84.

It should be understood that the ends may be formed by means other than tools 80 and 83 such as by pinch-rolls, for example. They may be formed cold when the pipe material and dimensions allow, or they may be formed after heating the ends to be swaged as with an induction coil, to above the lower critical temperature when required by customer specifications, extremely thick pipe walls or by the pipe material.

Figure 3:
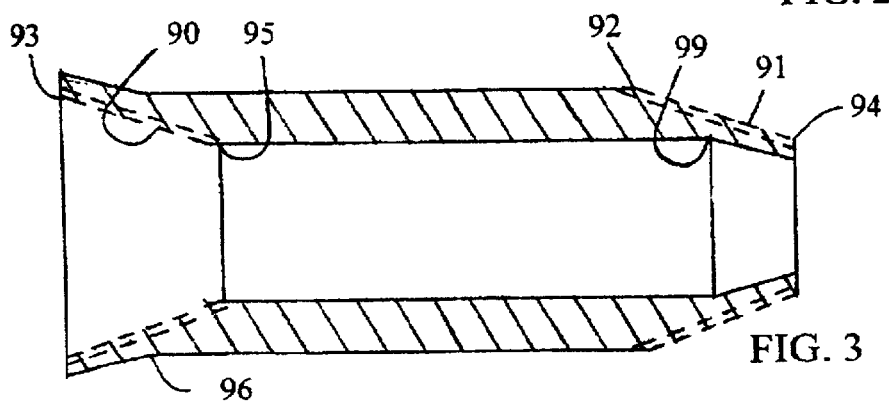
FIG. 3 depicts the pin and box of FIG. 2 after threading when no metal-to metal seal is required.

FIG. 3 depicts the ends after threading wherein box thread 90 may extend from 93, a diameter substantially equal to the pipe original outer diameter, and terminate at 95, a diameter substantially equal to the pipe original bore. Pin threads 91 may extend from 94, a diameter substantially equal to the pipe bore, and terminate at 92, a diameter substantially equal to the original pipe O.D.

So as to allow threads near the pipe ends to carry their proportionate share of the loads in severe services, the ratio of the wall strength at the beginning of expansion 96 as compared to the full pipe wall strength, should be at least as great as the ratio of the engaged thread length between 96 and the pipe end, to the total engaged length of thread 90. Likewise, the ratio of the wall strength at the beginning of bore reduction 99 as compared to the full pipe wall strength, should be at least as great as the ratio of the engaged thread length between 99 and the pipe end, to the total engaged length of thread 91. However, connections made with lesser wall strengths at the beginning of expansion or bore reduction for less severe service conditions, are within the scope of the present invention if they are made by a method taught herein. Therefore it is now clear that the length of thread engagement may traverse as much as the full pipe wall so as to provide selectively up to a full strength connection, or for less severe applications, the length of thread may traverse less than the full pipe wall.

Figure 4:
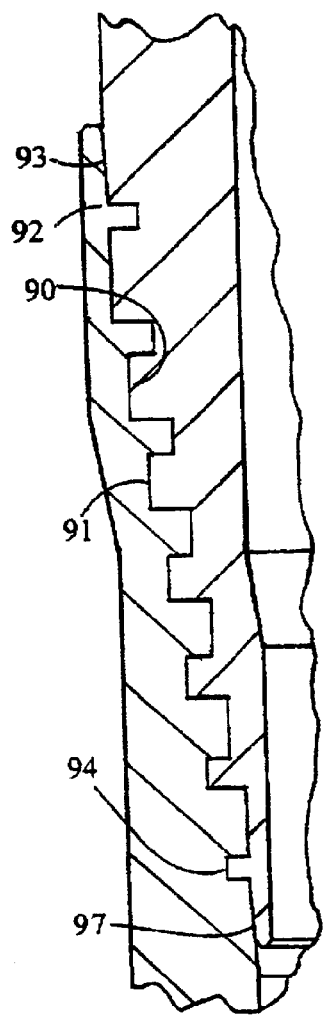
FIG. 4 depicts the connection after assembly, when two metal-to-metal seals are provided.
Figure 5:
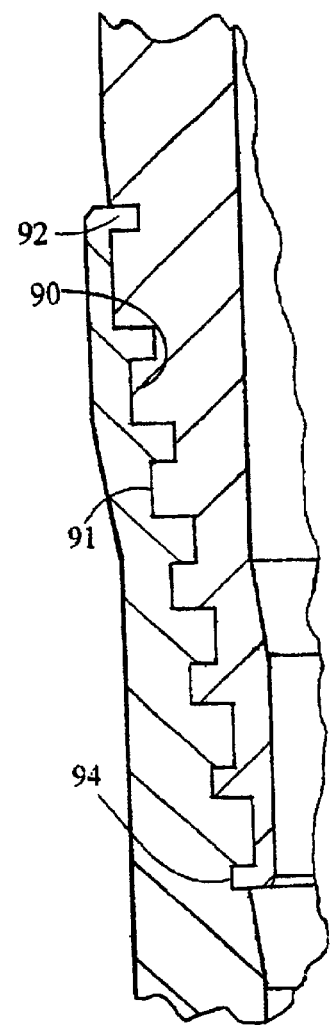
FIG. 5 depicts the connection after assembly, when no metal-to-metal seals are provided.

When required by service conditions, outer and/or inner metal-to metal seals described above and depicted in FIG. 4 as at 93 and 97, may be provided for any embodiment of the present invention and in such a case, the threads may or may not be dimensioned to seal so as to reduce cost and/or prevent dope pressure buildup between mating threads. In any case when metal-to-metal seals are to be provided, the predetermined end-lengths must be sufficiently increased therefore. When used with the present invention, my open type wedgethreads described in co-pending applications Ser. No. 09/421,483 or PCT/US00/28829, may be dimensioned to seal against high gas pressures and also provide up to a fill strength connection selectively, and they also will provide a fixed makeup position that can withstand repeated assembly within a wide range of assembly torque's, even when formed on thin wall pipe. For use in some services, the present invention may be provided without metal-to-metal seals as depicted in FIG. 5 and in such a case, any suitable thread form may be used and dimensioned to seal if fluid pressure is to be contained, or when only a mechanical connection is desired, the threads may be dimensioned to not seal against fluid pressure.

I claim:

1. A method for forming a box within an end of a joint of pipe, comprising: machining a counter bore within the end so as to provide a desired first inner configuration; swaging outwardly, the first inner configuration to become a desired second inner configuration which simultaneously forms a resulting outer configuration having an outer diameter of larger dimension than the original joint of pipe outer diameter; and then machining the swaged second inner configuration to desired final box dimensions such that a box thread maximum diameter exceeds the original joint of pipe outer diameter.

2. The method of claim 1 wherein the desired first inner configuration comprises: a substantially conical surface extending substantially from the pipe bore and increasing in diameter toward the pipe end; a second annular surface positioned intermediate the conical surface and pipe end.

3. The method of claim 2, further wherein: the second surface is substantially cylindrical.

4. The method of claim 2, further wherein: the second surface is substantially conical.

5. The method of claim 2, further wherein: the second surface is substantially curved.

6. The method of claim 1, further comprising: the box being swaged by forcing a suitable swaging mandrel axially into the counterbore.

7. A threaded pipe connection comprising: the box of claim 1.

8. A method for forming a pin around an end of a joint of pipe, comprising: machining a portion of the end so as to provide a desired first outer configuration; swaging inwardly, the first outer configuration to become a desired second outer configuration which simultaneously forms a resuling inner configuration having an inner diameter of smaller dimension than the original joint of pipe inner diameter; and then machining the swaged second outer configuration to a desired final pin dimensions such that a pin thread minimum diameter is less than the original joint of pipe inner diameter.

9. The method of claim 8 wherein the desired first outer configuration comprises: a substantially conical surface extending substantially from the pipe outer diameter and reducing in diameter toward the pipe end; and a second annular surface positioned intermediate the conical surface and the pipe end.

10. The method of claim 9, wherein: the second surface is substantially cylindrical.

11. The method of claim 9, wherein: the second surface is substantially conical.

12. The method of claim 9, wherein: the second surface is substantially curved.

13. The method of claim 8, further comprising: the pin being swaged by forcing a suitable annular swaging tool axially around the first outer configuration.

14. A threaded pipe connection comprising: the pin of claim 8.

\* \* \* \* \*